Feb. 19, 1929.  W. B. THIEMANN  1,702,551
ENSILAGE HARVESTER
Filed Jan. 17, 1921   6 Sheets-Sheet 2
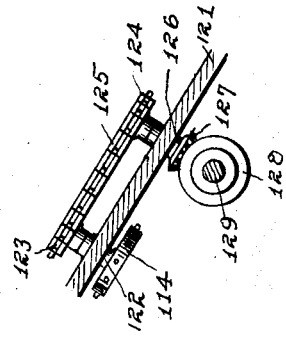
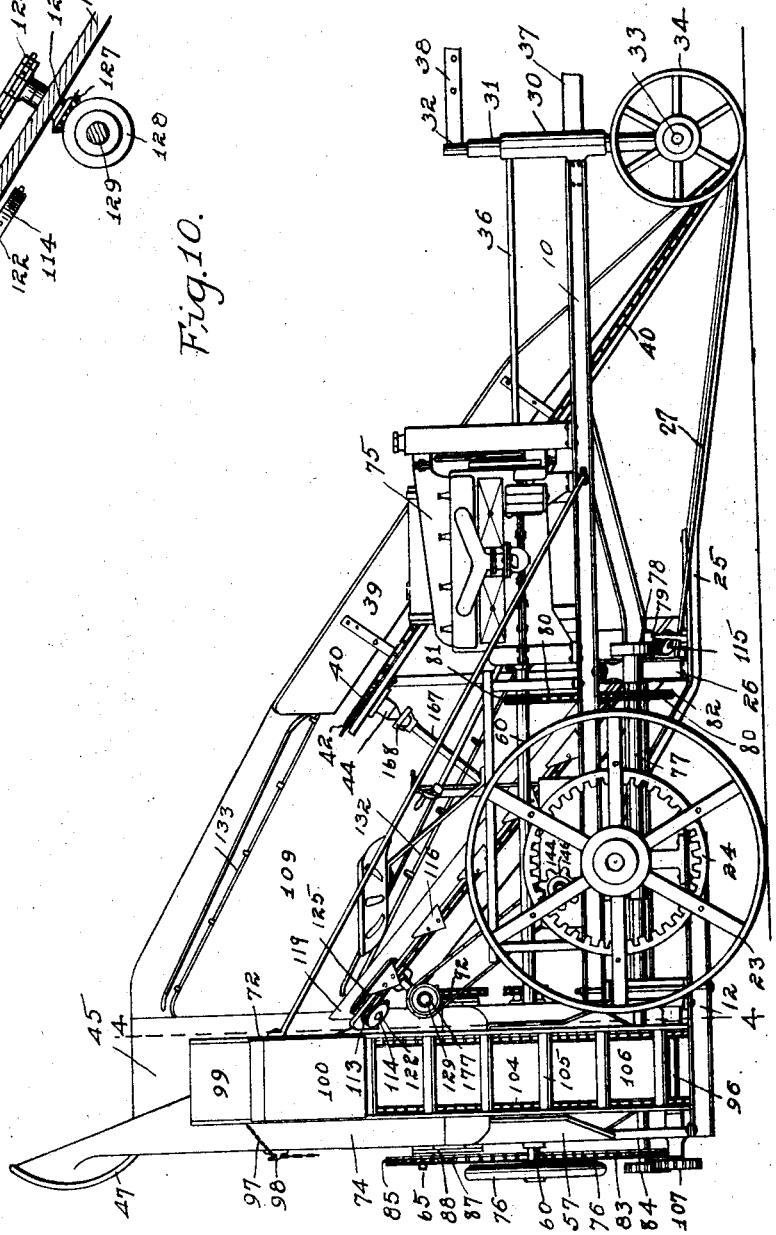

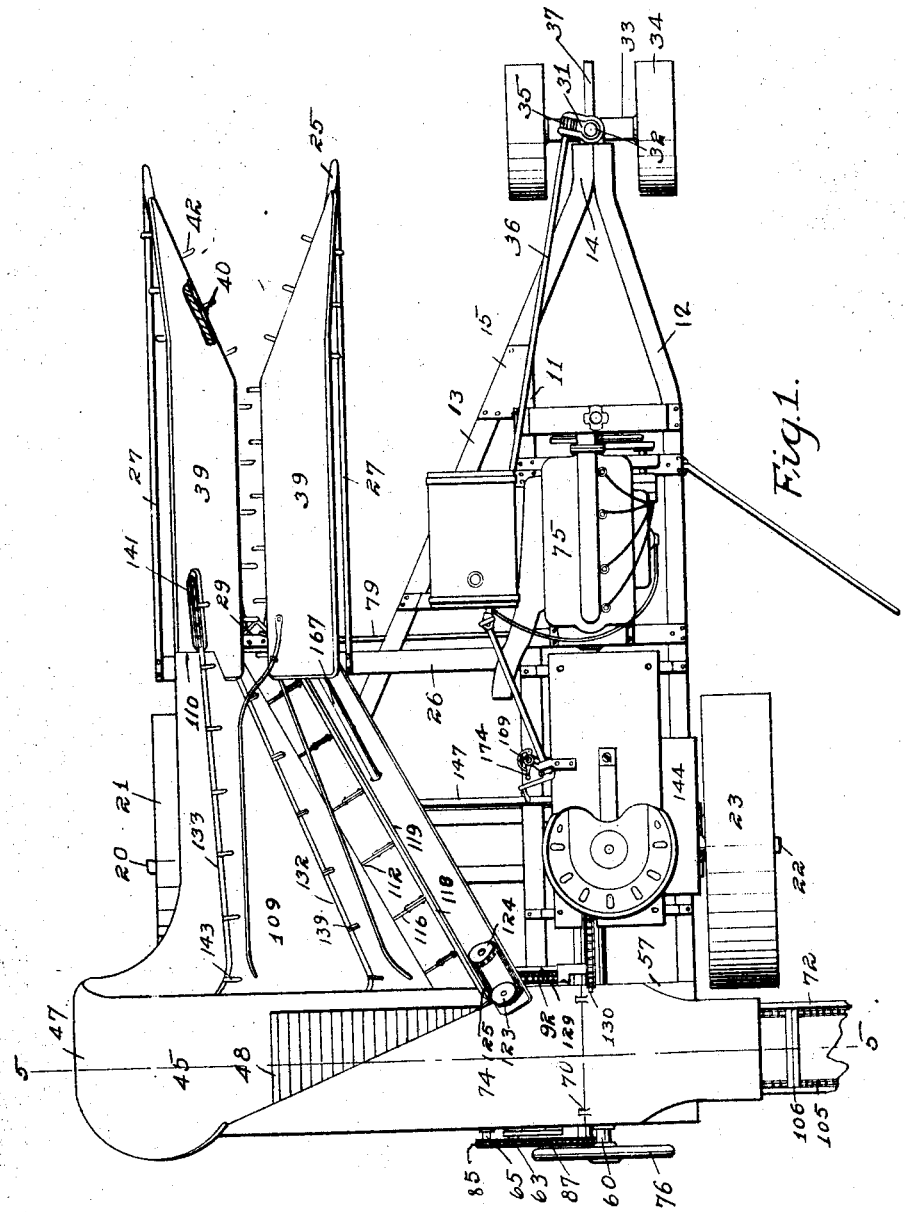

Feb. 19, 1929.
W. B. THIEMANN
1,702,551
ENSILAGE HARVESTER
Filed Jan. 17, 1921
6 Sheets-Sheet 3
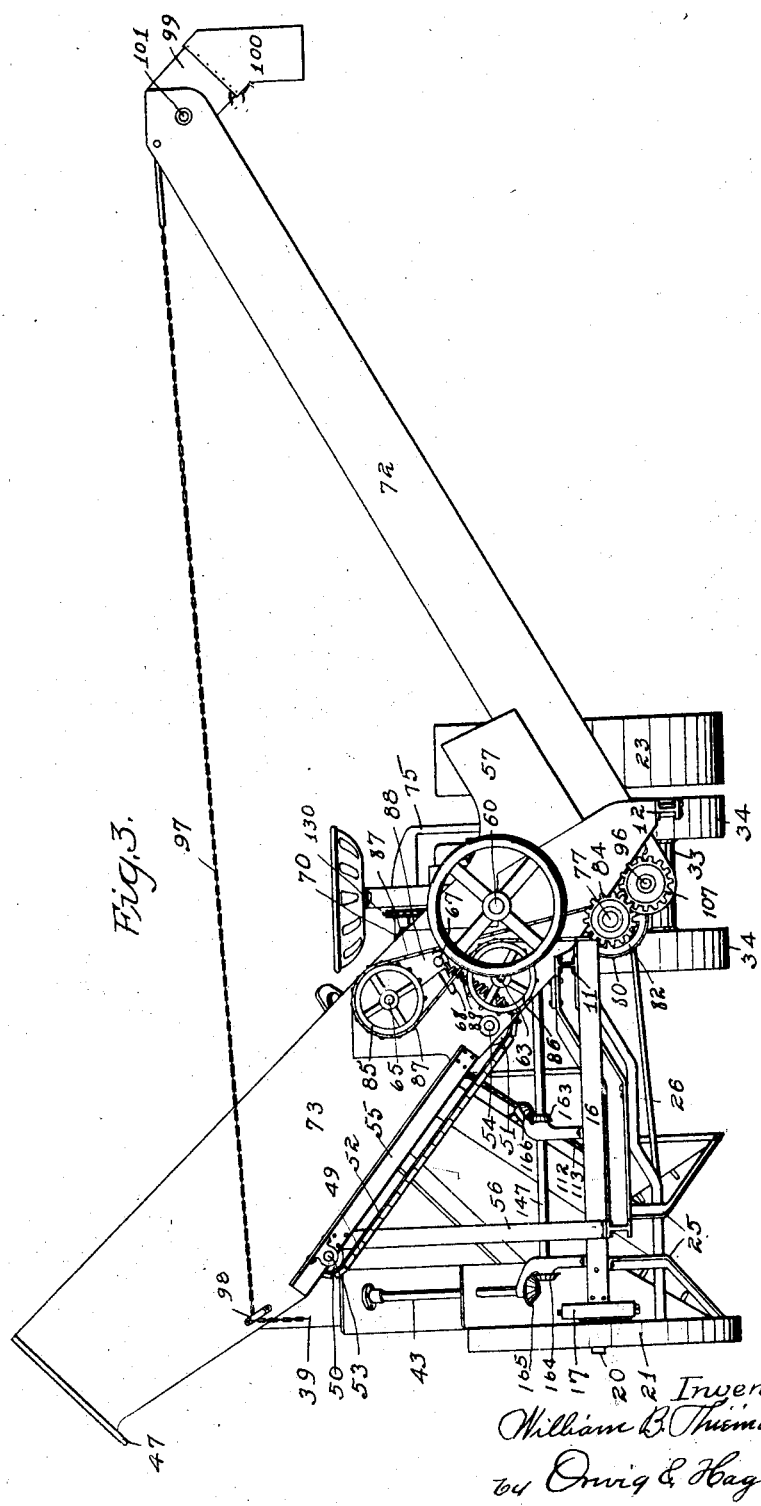

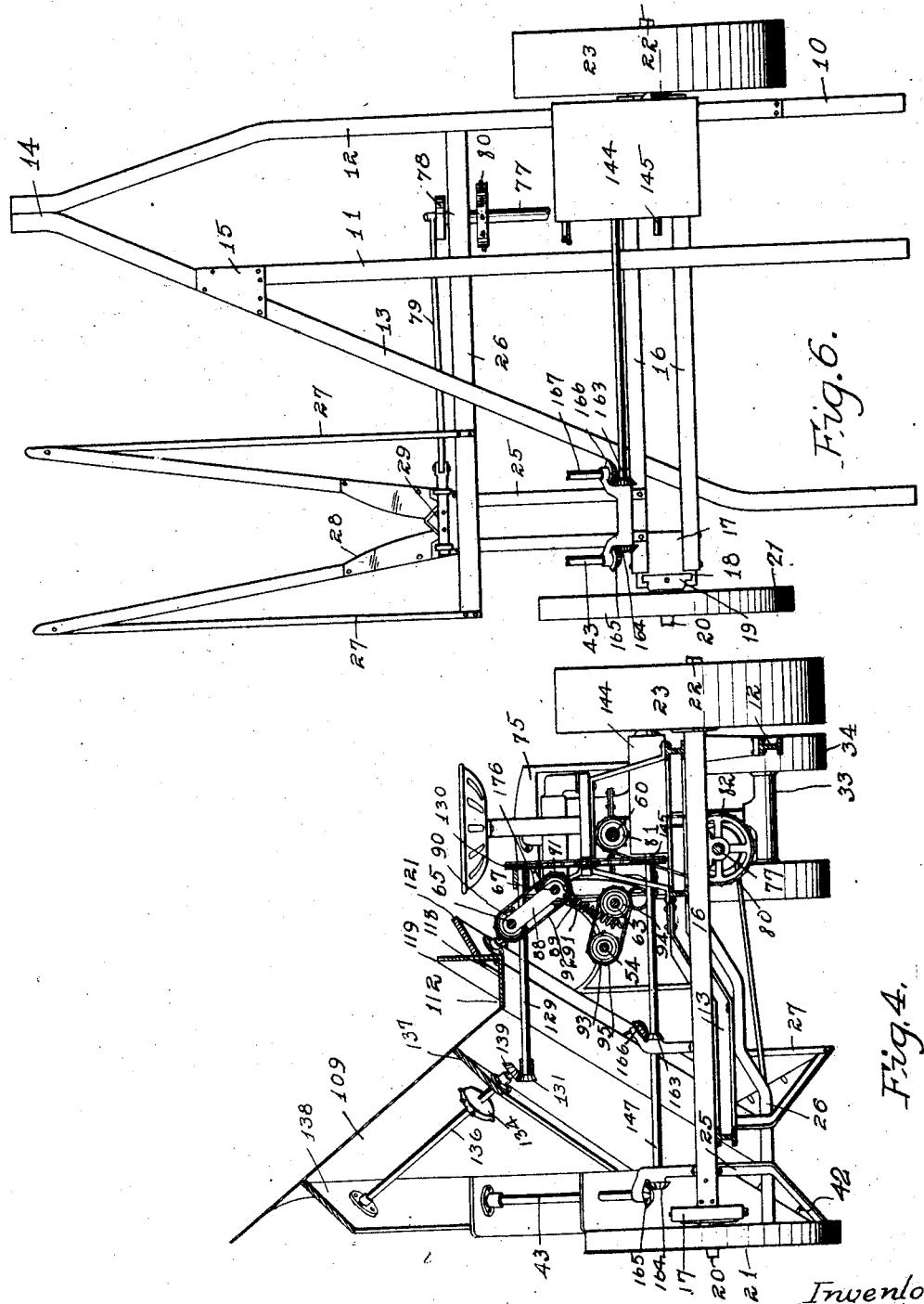

Feb. 19, 1929.
W. B. THIEMANN
1,702,551
ENSILAGE HARVESTER
Filed Jan. 17, 1921
6 Sheets-Sheet 5
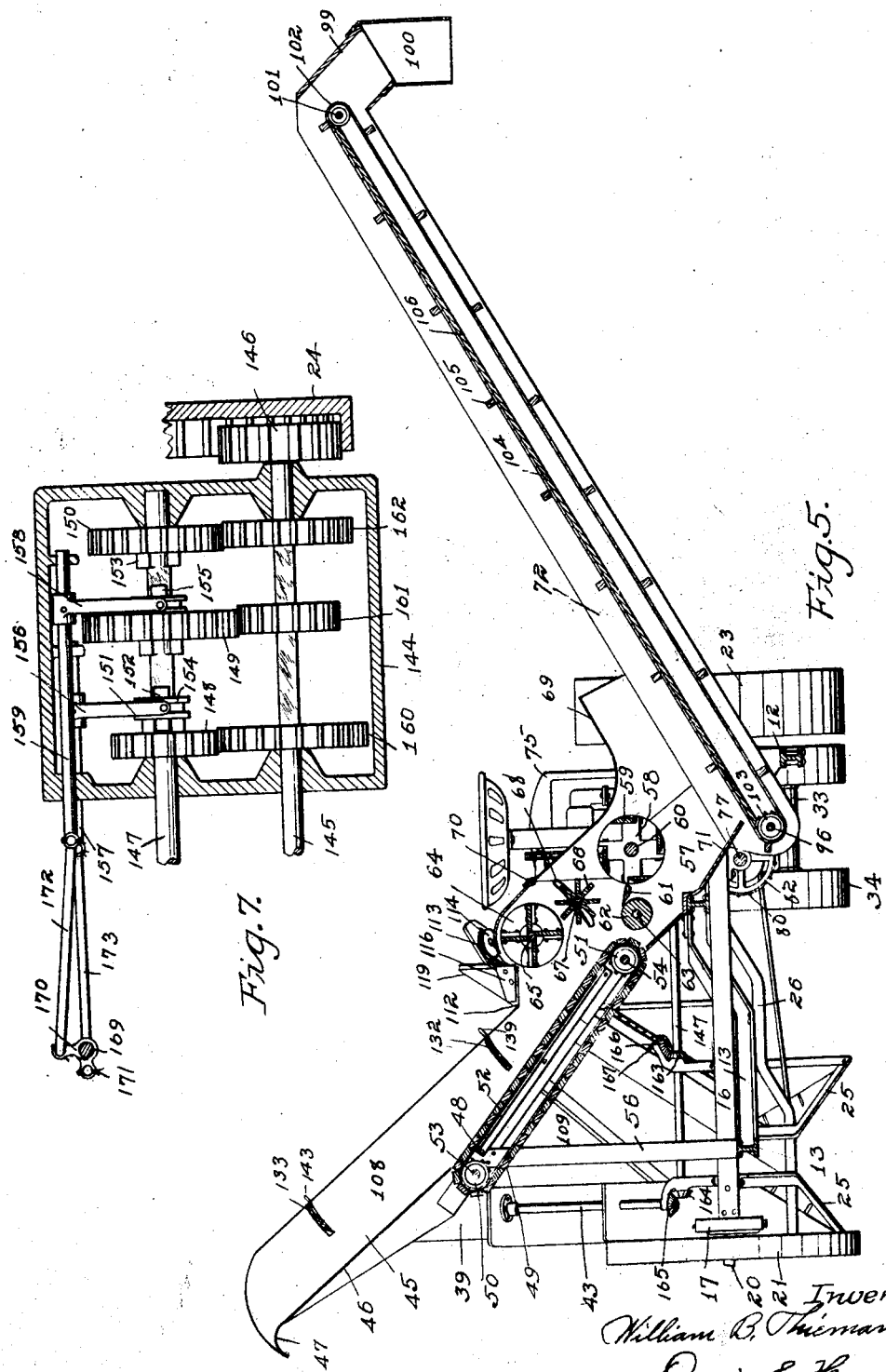
Inventor
William B. Thiemann
by Orwig & Hague Atty Feb. 19, 1929.                W. B. THIEMANN                1,702,551
                              ENSILAGE HARVESTER
                              Filed Jan. 17, 1921          6 Sheets-Sheet 6
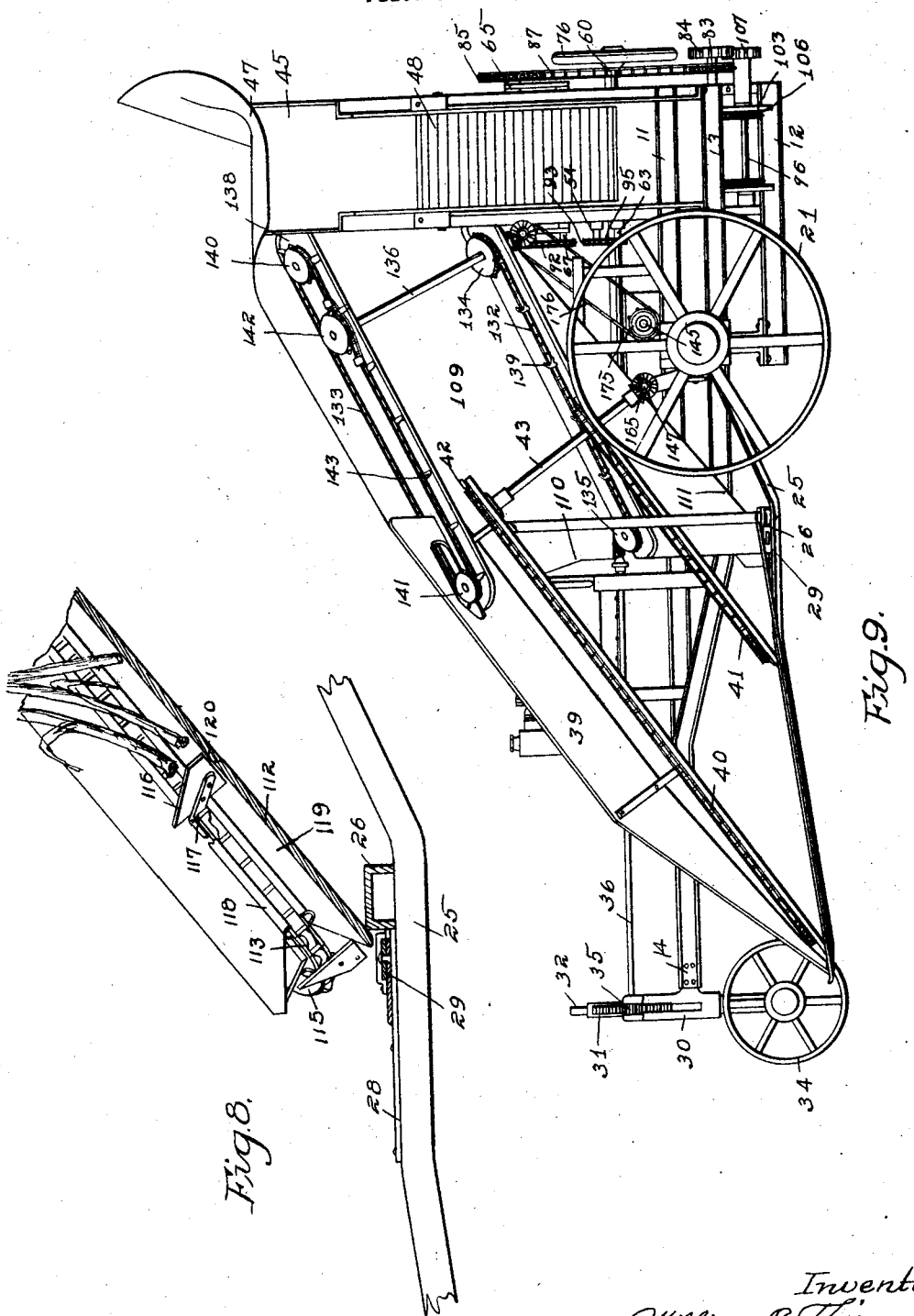
Inventor
William B. Thiemann
by Orwig & Hague Attys Patented Feb. 19, 1929.

1,702,551

UNITED STATES PATENT OFFICE.

WILLIAM B. THIEMANN, OF ALBERT CITY, IOWA, ASSIGNOR TO WILLIAM PETERSON AND EMMA THIEMAN, BOTH OF ALBERT CITY, IOWA.

ENSILAGE HARVESTER.

Application filed January 17, 1921. Serial No. 438,004.

This invention relates to improvements in harvesting machinery of the class designed to cut and handle stalks of plants, and is particularly adapted to handle corn stalks.

It is the object of my invention to provide a simple, durable and inexpensive means for automatically gathering standing or leaning corn stalks and conveying them to mechanism for operating thereon, in such a manner that the stalks will not become tangled as they are conveyed into position to be operated upon.

More particularly it is the object of my invention to provide means for gathering standing corn stalks and chopping them into short chunks for ensilage, and delivering the said ensilage to a wagon or similar device which may deliver the ensilage to a silo or similar storage place, as the machine is advanced through the field, having its mechanism so constructed and arranged that the above operations may be accomplished with a minimum amount of power required to operate the mechanism, the said mechanism being so arranged and mounted that the side draft will be practically eliminated.

A further object of my invention is to provide in a harvesting machine designed to gather and perform work on stalks of plants, new and improved means for operating the gathering means.

A further object is to provide in an ensilage harvester, new and improved means for elevating and feeding the stalks to the ensilage cutter.

These and other objects will be apparent to those skilled in the art, and need not be mentioned in detail.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of my improved harvesting machine, with a portion of the ensilage elevating conveyor broken away.

Figure 2 is a side elevation of my improved harvester.

Figure 3 is a back end elevation of the same.

Figure 4 is a transverse sectional view, taken on the line 4—4 of Figure 2.

Figure 5 shows a transverse sectional view of my improved harvester, taken on the line 5—5 of Figure 1.

Figure 6 is a detail plan view of the main frame upon which the gearing mechanism is mounted.

Figure 7 is a horizontal sectional view of the gear box, showing the manner in which the gears are mounted therein.

Figure 8 is a detail sectional view, showing the lower portion of the butt conveying trough, illustrating the manner in which the flexible conveyor is applied thereto.

Figure 9 shows a side elevation of my improved harvester, showing the side of the machine which operates adjacent to the standing corn; and Figure 10 is an enlarged detail view, showing the mechanism for driving the butt elevating conveyor.

My improved harvester is mounted upon a frame 10 having parallel and longitudinally arranged members 11 and 12, and a diagonally arranged member 13. The forward ends of the members 13 and 12 are secured together at 14, while the members 11 and 13 are secured together by means of a gusset plate 15. The back end of the member 13 is bent so that it extends parallel with the members 11.

Secured transversely with the members 11, 12 and 13 is an axle member 16, comprising parallel bars, which at one end have mounted between them a block 17. This block 17 is provided with a vertical groove 18, into which is slidably mounted a plate 19. The plate 19 is provided with an axle 20 on which is mounted a wheel 21. This plate 19 is slidably mounted in the groove 18 to provide means for adjusting the elevation of the adjacent end of the axle member 16.

Secured to the opposite end of the axle 16 I have provided an axle 22, on which is mounted the bull wheel 23. This bull wheel 23 is provided with an internal gear member 24, the purpose of which will hereinafter be made clear.

Mounted on the axle 16, near the wheel 21, are two forwardly extending frame members 25, having their back ends parallel and their forward ends diverging from each other, the forward ends also extending downwardly. Secured transversely beneath the members 11, 12 and 13 is a member 26, to which the members 25 are secured. The forward end of each of the members 25 is provided with a brace member 27, which is connected to the member 26. The forward end of the members 25 and the braces 27 form a supporting frame for the forward end of the gathering mechanism hereinafter to be described.

The members 25 are designed to straddle the row of corn to be cut while the portion 14 is designed to pass over the adjacent row of stubs. The portions of the members 25 just ahead of the members 26 are each provided with a cutter blade 28, arranged in a diagonal and diverging manner, with the rear cutting edges slightly spaced apart. These cutters will cut any scattering stalks in the hill, while the centerstalks are designed to be cut by means of a sickle 29 which is slidably mounted to operate transversely with the movement of the stalks between the members 25. This sickle I shall term a "harvester cutter" and is of the ordinary construction used in machines of this kind.

The member 14 of the frame 10 is mounted upon the bracket 30, which is designed to receive a slidable rack member 31, said rack member having a shaft 32 pivotally mounted therein. The lower end of the shaft 32 is provided with an axle 33, which is pivotally mounted thereon, each end of the said axle being provided with a wheel 34. The rack 31 is designed to be engaged by a pinion 35. This pinion 35 is provided with a shaft 36 which extends rearwardly.

Secured to the bracket 30 I have provided a hitch bar 37, by which the device may be advanced over the ground. The upper end of the shaft 32 is provided with a member 38, to which a suitable tongue may be attached for steering the truck member. The pivoted shaft 32 should be mounted substantially in line with the forward end of the members 25, so that as the wheels 34 of the truck are advanced transversely over the old rows of corn, the points of the members 25 will be elevated and lowered in unison with the wheels 34.

Secured to the members 25 I have provided inclined gathering members comprising boards 39 and conveyor members 40 and 41. Each of said conveyors is provided with laterally extending lugs 42, for the purpose of engaging the standing stalks. The construction of this gathering device is similar to those of corn binders now in common use, with the exception that I use an additional chain 41 mounted on the left-hand side of the machine, which is designed to engage the stalks near their butts and assist in gathering down and tangled corn. The conveyors on the left-hand side of the machine, or those shown in Figure 9, are operated by means of an inclined shaft 43, while the chain 41 on the opposite side is driven by means of a shaft 44, each of the shafts 43 and 44 being provided with the ordinary sprocket wheels for engaging the chains.

Secured on the back end of the frame 10 I have provided what I shall term a "transverse conveyor", which comprises an inclined chute 45 having an inclined bottom member 46, the upper end of which is turned over at 47 to enable the leaves and bent stalks to be fed downwardly through said chute without catching on the upper end. The upper end of the bottom 46 is mounted a considerable distance above the wheel 21, while the bottom end is in communication with a conveyor member 48.

The conveyor member 48 comprises chains 49, which are designed to operate upon sprockets 50 and 51, and a series of transverse slats 52. This conveyor is also inclined, but at a slightly less angle than the member 46, and is provided for the purpose of feeding the stalks into the chopping mechanism hereinafter to be described. The sprockets 50 are mounted on a shaft 53, while the sprockets 51 are mounted on a shaft 54, the said shafts being carried by inclined frame members 55 which are supported by means of supports 56 mounted on the member 13 of the main frame.

The lower end of the chute 45 is provided with side plates 57 which are mounted on the back ends of the frame members 11 and 12.

Rotatably mounted in the plates 57 I have provided an ensilage cutter member 58, having a series of blades 59 which are of the type used in machines of this kind. The members 58 are mounted on a shaft 60 mounted above the frame members 11 and 12, and substantially midway between them. The usual ledger plate 61 is provided, and is designed to lie adjacent to a feed roller 62 mounted on a shaft 63.

Mounted substantially above the lower end of the conveyor 48 is a beater member 64, mounted on a shaft 65, which is rotatably mounted in the plates 57. Mounted between the beater 64 and the cutter 58 is a secondary feeding or beater member 66, mounted on a shaft 67, said shaft being mounted in slots 68 in the plates 57. The slots 68 are formed circular, their radial centers terminating in the center of the shaft 65. The members 58 are provided with a cover plate 69, the upper end of which is provided with a hinged portion 70 for the purpose of permitting the operator to observe the working condition within.

An inclined bottom plate 71 is provided at the lower end of the conveyor 48 to receive the ensilage from the cutter member 58 and to draw it to the elevating conveyor 72, the operation of which will hereinafter be described. The chute 45 is provided with a back plate 73, the upper end of which is a continuation of the rolled or curved portion 47. The lower end of the upper edge of the plate 73 is provided with a triangular shaped cover plate 74, clearly shown in Figure 1 of the drawings, the purpose of which will hereinafter be made clear.

The cutter member 58 is rotated in a counter-clockwise direction by means of the shaft 60, which is extended forwardly and connected direct to the crank shaft of the engine 75. This engine is mounted upon the members 11 and 12, as clearly illustrated in Figures 1 and 2. The back end of the shaft 60 is provided with a fly wheel 76, which serves the purpose of imparting a uniform action to the cutters 59 and assists in taking care of the excessive feeding.

Mounted longitudinally beneath the shaft 60 and beneath the members 57, is a shaft 77, having its forward end provided with a crank wheel 78. The crank wheel 78 is designed to operate the sickle 29 through the connecting rod 79, and is driven by means of a chain 80 operating on a sprocket 81 on the shaft 60, and a sprocket 82 on the shaft 77. The rear end of the shaft 77 is provided with a sprocket 83 and a spur gear 84. The shaft 65 of the beater 64 is extended rearwardly through the back plate 57, and is designed to carry a sprocket 85. The shaft 63 is also extended rearwardly through the plate 57, and is designed to carry a sprocket 86. The sprockets 85, 86 and 83 are designed to carry a chain 87, thus providing means for the rotation of the beater 64 and the roller 62.

The shaft 67 is mounted in pivoted bearing members 88, pivotally mounted on the shaft 65, the free end of said members being yieldingly held downward by means of springs 89. The forward end of the shaft 65 is designed to carry a sprocket 90 (Figure 4), and the forward end of the shaft 67 is designed to carry a sprocket 91. The sprockets 90 and 91 are operatively connected by means of a chain 92, thus providing means for the rotation of the shaft 67. The shaft 67 is mounted in the members 88 in such a manner that either end of the shaft may be elevated above the other, so that the member 66 will adjust itself to the differences in the thickness of the stalks as they are being fed to the cutters 59, the springs 89 always tending to hold the member 66 to its bottom limit of movement so that the incoming stalks may be accurately fed to the said cutters. The forward ends of the shafts 54 and 63 are provided with sprockets 93 and 94, respectively, said sprockets being designed to carry a chain 95, thus providing means for the rotation of the shaft 54, which will in turn cause the conveyor member 48 to be rotated with the upper run traveling downwardly.

Mounted beneath the shaft 77, and slightly to one side, I have provided a shaft 96 designed to have pivotally mounted thereon the inclined conveyor trough 72. The upper end of this trough is secured in position by means of a chain 97, one end of which is adjustably connected to a bracket 98 on the back side of the plate 73. The upper portion of the trough 72 is provided with a chute 99 having a flexible hood 100 at its lower end. The upper end of said chute is also provided with a shaft 101, carrying the sprockets 102. The shaft 96 is also provided with sprockets 103. The sprockets 102 and 103 are designed to carry a flexible conveyor member 104 having transverse cleats 105. The cleats 105 are designed to be slidably mounted on the bottom member 106, thus forming a conveyor by which the chopped stalks may be elevated to the hood 100, which is so arranged and constructed that it may be carried above a wagon bed or similar receptacle.

The shaft 96 has its rear end provided with a spur gear 107, which is in mesh with a spur gear 84, thereby providing means for driving the conveyor 104.

The forward edge of the plate 46 is provided with the side member 108, the upper edge of which is curved forwardly and is mounted at an angle of substantially forty-five degrees to the perpendicular, the side member 108 being of such a height that stalks of corn delivered to the plate 46 and the conveyor 48 may be fed longitudinally on the said conveyor without interfering with any stalks that might be delivered to the conveyor into the chute over the top edge of the member 108.

For conveying the stalks from the gathering mechanism to the chute 45, I have provided mechanism which consists in a tight platform 109 having its rear and upper edge connected to the upper edge of the member 108, while its forward and lower edge is arranged vertically adjacent to the sickle 29. The said edge is indicated by the numeral 110 in Figure 9 of the drawings, and is mounted adjacent to the left hand set of conveyor chains 40 and 41. This provides a sort of a twisted platform having at its lower edge 111, a trough 112. The lower end of the trough 112 is in communication with the sickle, while its upper end terminates at the lower end of the upper edge of the plate 108 and adjacent to the beater 64, as clearly shown in Figure 5. This trough is for the purpose of conveying the butts of the stalks of corn, and is provided with a conveyor chain 113 mounted upon sprockets 114 and 115. The chain 113 is provided with a series of pivoted plates 116, each of which is provided with arms 117 which are designed to travel in a grooved plate 118, best shown in Figure 8, the plate 118 being designed to rest against the side member 119 of the trough 112. The arms 117 are designed to travel in the grooved portions 118 for the purpose of holding the plates 116 in a radial position relative to the chain as the said plates are moving upwardly through the trough. The plates 116 are so arranged and mounted that their lower edges 120 will lie adjacent to the bottom of the trough 112 as the said plates are advanced through it.

The chain 113 is so mounted that the plates 116 will move directly above the sickle 29 in such a manner that the butts of the corn will be engaged near their several ends and will be immediately pulled onto the bottom of the trough 112. By providing the plates 116 of considerable size and width, and having them move adjacent to the bottom of the trough, I have provided means for engaging curved or bent stalks and elevating them so that the lower ends of said stalks will not pass beneath the plates 116 or beneath the chain 113, as is permitted by the ordinary construction of butt elevating conveyors. By this arrangement the stalks may be elevated without becoming entangled in or pinched beneath the stalk engaging members, or beneath the chain.

The sprockets 114 and 115 are pivotally mounted on an inclined board member 121. The sprocket 114 is provided with a shaft 122, which extends through the board 121 and is provided at its upper end with a sprocket 123. The sprocket 123 is operatively connected with a sprocket 124 by means of a chain 125. The sprocket 124 is mounted on a shaft 126 extending downwardly through the board 121 and having at its lower end a bevel gear 127 designed to mesh with a bevel gear 128 mounted on a shaft 129 arranged transversely in the machine and provided at one end with a sprocket 130, and provided at the other end with a bevel gear 131, shown in Figure 4 of the drawings.

The means for operating the shaft will be hereinafter described.

For moving the top portions of the stalks over the platform 109 I have provided conveyor members 132 and 133. The conveyor 132 is mounted on sprockets 134 and 135, the sprocket 134 being mounted on a shaft 136 which is mounted in suitable boards 137 and 138. The lower end of the shaft 136 is provided with a bevel gear 139, designed to mesh with a bevel gear 131. The conveyor 132 is provided with suitable lugs 139 for engaging the stalks, the said conveyor being designed to pass through suitable openings in the platform 109, and to have one of its runs pass above said platform, as illustrated in Figure 1. The member 138 is provided with pivoted sprockets 140 and 141, designed to carry the conveyor 133. The upper end of the shaft 136 is provided with a sprocket 142 which is designed to engage the lower run of the conveyor 133 for the purpose of driving said conveyor. The lower end of the conveyors 132 and 133 are arranged in an overlapping manner with relation to the conveyors 40 and 41, so that stalks may be passed from one set of conveyors to the other without interruption. The conveyor 133 is also provided with lugs 143. The upper ends of the conveyors 133 and 132 are designed to communicate with the upper edge of the plate 108, as clearly shown in Figure 5.

By the arrangement of the platform 109 and the conveyors 132, 133 and 113, I have provided means whereby standing stalks delivered from the gathering mechanism may be conveyed laterally to the chute 45 in an inclined and transverse position, and dumped over the upper edge of the plate 108 and permitted to fall upon the member 46 and the conveyor 48, the upper edge of the plate 108 being of such a width that the stalks moving longitudinally through the chute 45 will not interfere with those being delivered laterally over the top edge of the plate 108.

For driving the gathering conveyors and the above mentioned conveyors, I have provided the following mechanism:

Mounted upon the members 12 and 16 I have provided a gear box 144 adjacent to the bull wheel 23. Rotatively mounted in the said box I have provided a shaft 145, one end of which is provided with a pinion 146 designed to mesh with the internal gear 24, as clearly illustrated in Figure 7. Mounted parallel with the shaft 145 I have provided a shaft 147, designed to have rotatively mounted thereon gears 148, 149 and 150, each of said gears being provided with a clutch member 151, 152 and 153 respectively.

Splined to the shaft 147, between the gears 148 and 149, I have provided grooved clutch member 154 designed to coact with either of the clutches 151 and 152. Mounted on the said shaft between the gears 150 and 149, I have provided a grooved clutch member 155, designed to coact with the clutch 153. The clutch 154 is operated by means of a yoke 156 mounted on a slidable shaft 157, while the clutch 155 is operated by means of a yoke 158 mounted on a slidable shaft 159. The gears 148 and 149 and 150 are of different diameters, and are designed to mesh with gears 160, 161 and 162 respectively, fixed to the shaft 145. The inner portion of the shaft 147 is provided with bevel gears 163 and 164. The bevel gear 164 is in mesh with a bevel gear 165 on the lower end of the shaft 43, thereby providing a means for driving the outside conveyor 40 and the lower conveyor 41. The bevel gear 163 is in mesh with the bevel gear 166 mounted on a shaft 167, the upper end of which is provided with a universal joint 168 operatively connected with the lower end of the shaft 44, thereby providing means for driving the inside conveyor 40.

In this connection it might be noted that as the machine is advanced over the ground surface, the pinion 146 will be rotated through the gear 24, which will in turn cause the shaft 145 to be rotated and the gears 148, 149 and 150 to be rotated. On account of said gears being of different diameters, they will rotate at different speeds, either of said gears being operatively connected with the shaft 147 by means of a shaft 169 having crank arms 170 and 171. The crank arm 170 is provided with a link 172 pivoted to the outer end of the shaft 159, while the crank 171 is operatively connected with the shaft 157 by means of a link 173.

The clutches 152 and 153 are thrown into operative or inoperative position with their mating clutches, by oscillating the shaft 169, the upper end of which is provided with a handlever 174.

When the gears 149 and 161 are in operative relation with the shaft 147, the elevating conveyors will be driven at the same speed as the conveyors 132, 133 and 113. This is the speed at which the elevating conveyors will be operated when the corn stands in a vertical position. But if the operator is gathering corn which is leaning forwardly, the gears 148 and 160 will be brought into operative relation with the shaft 147, thereby causing the elevating conveyors to be operated at a speed higher than the speed of the conveyors 132 and 133, which will cause the leaning stalks to be brought to a substantially vertical position by the time they have reached the lower edge of the platform 109. If the corn is leaning backwardly or toward the machine, then the clutch 155 is brought into action with the clutch 153, causing the gears 150 and 162 to be in operative relation, which will cause the elevating conveyors to travel at a lower speed than the conveyors 132 and 133, thereby causing the leaning stalks to assume a substantially vertical position by being crowded ahead by the advance of the machine, due to the retarding movement of said elevating conveyors.

I therefore form means whereby leaning stalks may be brought to an elevated position at the will of the operator, which is a very essential feature in machines of this class, to prevent the stalks from becoming tangled as they are delivered over the upper edge of the chute 145.

Connected to the inner end of the shaft 145 I have provided a sprocket 175, designed to carry a chain 176 which is mounted on the sprocket 130, beore described, thereby providing means for driving the conveyors 132, 133 and 113.

In this connection it will be noted that the said conveyors are driven at a constant speed relative to the advance of the machine, due to the positive connection through the shaft 145 with the internal gear, the speed of said conveyors being such as to move the stalks rearward at substantially the same speed that the machine is advanced forwardly.

As the stalks are delivered from the gathering conveyors to the platform 109, they will be moved over said platform first in a vertical position and then in an inclined position, with the stalks transverse with the longitudinal movement of the machine, and delivered to the chute 45 in such transverse and inclined position, and will drop upon the conveyor 48 and be moved longitudinally beneath the beaters 64 and 66. The plates 116 being pivotally mounted, will have their arms 117 disengage the grooved plate 118 at the upper end of the chute 112 in such a manner that the said plates will fall backwards and thereby disengage the butt ends of the stalks just as they are being fed to the beater 64. This beater, which rotates in a counter-clockwise direction, will force the butt ends of the stalks beneath it and to the beater 66.

In spite of the fact that I have been able, with my improved variable speed device, to place substantially all of the stalks on the platform 109 in parallel relation to each other, it sometimes happens that crooked stalks will have their butt ends come up first, which would cause them to pass over the chute 45. To provide against this I have provided the hood member 74, which is of such a shape that the said butt ends will pass beneath the plate 74 and will be retained against the side of the plate 73 until the tops of the stalks have been moved rearwardly until the said stalks assume a position substantially longitudinally of the chute 45, at which time they will drop therein and be fed to the cutter, as above described, thereby providing means whereby the stalks will be positively fed to the cutter without becoming entangled among themselves or in the elevating and conveying mechanism.

It will also be seen from the above described construction, that the gathering and elevating conveyors are driven direct from the bull wheel of the binder, while the harvester cutter or sickle and the ensilage cutter, with its necessary operative mechanism, are driven from the engine 75. This provides means for elevating and delivering the stalks at the proper speed with relation to the advance of the machine, and also means for positively operating the cutting mechanism in such a manner that the machine will always clear itself and will not become clogged if the advance speed of the machine should be slowed up, as would be the case if all of the mechanism was driven from the said bull wheel. Further in this connection, machines of this kind require so much power to operate them that it is practically impossible to drive the entire mechanism from said wheel.

One of the advantages of my device lies in the arrangement of the various mechanisms relative to the said bull wheel so as to substantially place the most of the weight over the said wheel, which is mounted substantially in line with the draft member 37 to prevent side draft. This I have found by actual experience to be a very serious difficulty in machines of this kind. It will be noted that the ensilage cutting mechanism is placed substantially in line with said draft, for the same purpose.

The upper end of the chute 45 is mounted so as to be substantially above the tops of standing stalks adjacent to the row being cut, so that the top ends of the stalks delivered to the chute 45 will be above the tops of the standing stalks and will not become tangled with the standing stalks as they are moved to operative position.

This I have also found to be a serious difficulty in machines of the type which first throw the stalks to substantially a horizontal position before they are fed to the ensilage cutter. The distance between two rows of stalks is about forty-two inches, which ordinarily represents the distance between the cutter and the row of stalks being harvested, which would leave practically seven feet between the cutter and the adjacent row of standing stalks. As a matter of fact, it is not uncommon for stalks to be twelve feet high, which would in that case mean that five feet of the upper end of the harvested stalks would tangle in with the adjacent row of standing stalks. This difficulty I have overcome by my arrangement of the inclined conveyor 45.

By providing the inclined platform 109, it will be seen that the stalks will simply travel on the top surface of the same with the butt ends in the trough 112. I have provided means whereby the conveying mechanism which carries the stalks from the harvester cutter to the transverse conveyor will have one side open so that the operator may assist the stalks in case they should become tangled or clogged, as they are delivered from the said platform to the said transverse conveyor. It will be noted in the drawings that the seat is so located that the operator may easily reach over the delivery end of the said platform and grasp any stalks that may be causing the trouble. This is a very important feature in a device of this kind due to the fact that often stalks are bent or crooked before they are received by the gathering mechanism. These stalks sometimes cause trouble at this point by catching over the sides of the platform or transverse conveyor.

I claim as my invention:

1. In a harvesting machine, a stalk gathering mechanism, a stalk chopping mechanism, means for conveying the stalks from the gathering mechanism and delivering them to the chopping mechanism, and means for varying the speed of the gathering mechanism relative to the speed of the stalk conveying mechanism.

2. In a harvesting machine, the combination with a traction member and a stalk gathering means, of means for driving said gathering means at variable speeds relative to the speed of said traction member.

3. In a harvesting machine of the class described, a supporting frame, a harvesting cutter arranged to operate in a substantially horizontal plane, means for gathering and delivering stalks to the said harvester cutter in a substantially upright position, a rearwardly and upwardly extending trough having its lower end terminating adjacent to said harvester cutter, said trough being provided with a bottom and one side, an endless conveyor designed to operate adjacent to and longitudinally with the side member of said trough, said conveyor being designed to carry a number of laterally extending gathering plates, each of said plates having one of its edges adjacent to the bottom of the trough and another one of its edges adjacent to the side of said trough, means at each end of said troughs for rotatably carrying and driving said conveyor, the means at the lower end of said trough being arranged in such a position relative to the harvester cutter that the said laterally extending gathering plates will travel over the said harvester cutter to engage the butt ends of the stalks as they are being severed and pull them into the trough, and means for conveying and delivering the stalks to the upper end of said trough.

4. In a harvesting machine, a traction member, a harvester cutter, a stalk gathering means, means for operating on the gathered stalks, means for conveying the stalks from said gathering means and delivering them to said operating means, and means actuated by said traction member for driving the gathering and conveying means, said last means including hand-operated means for varying the speed of the said gathering device relative to the speed of the conveying means, and independent means for driving the remaining above described means.

5. In a harvesting machine, a harvester cutter, a stalk gathering means, means for receiving and operating on the gathered stalks, and means for actuating the above described means, said actuating means including a device for manually controlling and varying the speed of the gathering means relative to the speed of the other mechanism.

6. In a harvesting machine, a stalk gathering means, a harvester cutter, a chopping mechanism, a transverse conveyor, a conveying mechanism for receiving the stalks from the gathering means in a vertical position and delivering them to the transverse conveyor laterally in a transverse position, the transverse conveyor being located beneath the discharge end of the first said conveyor to feed stalks longitudinally to the chopping mechanism without interfering with the lateral movement of the stalks as they are discharged into said transverse conveyor.

7. In a harvesting machine, a stalk gathering means, a harvester cutter, means for operating on the gathered stalks, an inclined transverse conveyor, and a conveying mechanism for receiving the stalks from the gathering means in a vertical position, and delivering them to the transverse conveyor laterally in a transverse and inclined position, the transverse conveyor being located beneath the discharge end of the first said conveyor to feed the stalks longitudinally to the operating mechanism without interfering with the lateral movement of the stalks as they are discharged into said transverse conveyor.

8. In a harvesting machine, a stalk gathering means, a harvester cutter, a chopping mechanism, an inclined transverse conveyor, a conveying mechanism for receiving the stalks from the gathering means in a vertical position, and delivering them to the transverse conveyor laterally in a transverse and inclined position, the transverse conveyor being located beneath the discharge end of the first said conveyor to feed the stalks longitudinally to the chopping mechanism without interfering with the lateral movement of the stalks as they are discharged into said transverse conveyor, and means for driving all of said means, said last means including mechanism for driving the gathering means in variable speeds relative to the speed of the other mechanism.

9. In a harvesting machine, a traction member, a stalk gathering means, a stalk conveying mechanism, means for driving both of said means from said traction member, a motor, a harvester cutter, a chopping mechanism, a transverse conveyor for delivering stalks to said chopping mechanism from the said conveying mechanism, means for elevating and delivering the said chopped stalks, all of the latter means being driven from the said motor.

10. In a harvesting machine, a stalk gathering means, a harvester cutter, a chopping mechanism, an inclined transverse conveyor, a conveying mechanism for receiving the stalks from the gathering means in a vertical position, and delivering them to the transverse conveyor laterally in a transverse and inclined position, the transverse conveyor being located beneath the discharge end of the first said conveyor to feed the stalks longitudinally to the chopping mechanism without interfering with the lateral movement of the stalks as they are discharged into said transverse conveyor, means for driving all of said means, said last means including mechanism for driving the gathering means in variable speeds relative to the speed of the other mechanism, and means for elevating and delivering the chopped stalks.

11. In a harvesting machine, a stalk gathering means, a harvester cutter, a chopping mechanism, an inclined transverse conveyor, a conveying mechanism for receiving the stalks from the gathering means in a vertical position, and delivering them to the transverse conveyor laterally in a transverse and inclined position, the transverse conveyor being located beneath the discharge end of the first said conveyor to feed the stalks longitudinally to the chopping mechanism without interfering with the lateral movement of the stalks as they are discharged into said transverse conveyor, and a gathering hood for said transverse conveyor.

12. In a harvesting machine, a traction member, a stalk gathering means, stalk conveying mechanism, means for driving both of said means from said traction member, and the gathering means at variable speeds, a motor, a harvester cutter, a chopping mechanism, a transverse conveyor for delivering stalks to said chopping mechanism from the said conveying mechanism, and means for elevating and delivering the said chopped stalks, all of said latter means being driven from said motor.

13. In a harvesting machine, a traction member, a stalk gathering means, stalk conveying mechanism, means for driving both of said means from said traction member, and the gathering means at variable speeds, a motor, a harvester cutter, a chopping mechanism, a transverse conveyor for delivering stalks to said chopping mechanism from the said conveying mechanism, means for elevating and delivering the said chopped stalks, all of said latter means being driven from said motor, and means for elevating and lowering the gathering means.

14. In a harvesting machine, the combination with a main frame having a traction member and means for receiving and operating on stalks, of a gathering means comprising an upper set of inclined endless belt devices running in opposite directions, and a shorter and similar lower belt device, and means for simultaneously driving both sets of belts from the said traction member at variable speeds.

15. In a harvesting machine, the combination with means for gathering, elevating and conveying stalks in a transverse and inclined position, of mechanism at the lower end of the stalks to receive said stalks, comprising feeding mechanism, a chopping device, and a primary and secondary beater, the said secondary beater being capable of up-and-down movement and having a longitudinal rocking movement.

16. In a harvesting machine, a stalk gathering means, a harvester cutter, a chopping mechanism, a conveyor mechanism for receiving the stalks from said gathering means in a vertical position and delivering them to the chopping mechanism in a transverse and inclined position, said mechanism comprising a closed platform having its forward edge adjacent to said gathering means and substantially vertical, and its back edge inclined at substantially forty-five degrees to said front edge, the lower edge of said platform being provided with a trough having its forward end adjacent to the harvester cutter, and its back and upper end adjacent to said chopping mechanism, a transverse and inclined conveyor beneath the back end of said platform, arranged to feed stalks longituidnally to said chopping mechanism, conveyor chains for said platform, a conveyor chain for said trough, and means for actuating all of said devices.

17. In a harvesting machine, a stalk gathering means, a harvester cutter, a chopping mechanism, means for conveying stalks from said cutter to said chopping mechanism, comprising a closed platform having its forward edge adjacent to said gathering means and substantially vertical, and its back edge inclined at substantially forty-five degrees with said front edge, said platform having its lower edge provided with a trough having its front end adjacent to the said harvester cutter, and its upper end adjacent to said chopping mechanism, a conveyor for said trough, having a series of stalk engaging plates arranged to travel first adjacent to said harvester cutter, and thence adjacent to the sides of said trough, conveyor chains for said platform, and means for actuating all of said means.

18. In a harvesting machine, a stalk gathering means, a harvester cutter, a chopping mechanism, means for conveying stalks from said cutter to said chopping mechanism, comprising a closed platform having its forward edge adjacent to said gathering means and substantially vertical, and its back edge inclined at substantially forty-five degrees with said front edge, said platform having its lower edge provided with a trough having its front end adjacent to the said harvester cutter, and its upper end adjacent to said chopping mechanism, a conveyor for said trough, having a series of stalk engaging plates arranged to travel first adjacent to said harvester cutter, and thence adjacent to the sides of said trough, and conveyor chains for said platform, and means for actuating all of said means, said driving means including means for driving the gathering mechanism at variable speeds relative to the conveying mechanism.

19. In a harvesting machine, a stalk gathering means, a harvester cutter, means for operating on stalks, and means for moving the stalks from said harvester cutter to said stalk operating means, including a butt conveying trough provided with a flexible conveyor member having laterally extending stalk engaging devices, comprising a series of pivoted plates designed to travel with some of their edges adjacent to, and their faces perpendicular to, the sides of said trough, the edges of said plates being arranged to travel adjacent to said harvester cutter.

20. In a harvesting machine having means for gathering, cutting and conveying stalks, a butt conveying trough provided with a flexible conveyor member having laterally extending stalk engaging devices comprising a series of pivoted plates designed to travel with some of their edges adjacent to, and their faces perpendicular to, the sides of said trough, one of the edges of said plates being arranged to travel adjacent to said harvester cutter when in one position of their movement.

21. In a harvesting machine, a stalk gathering means, a harvester cutter, means for operating on the gathered stalks, means for conveying stalks from said gathering means and delivering them to said operating means, a traction member, a gear device comprising a driving shaft operatively connected with said conveying means, and a driven shaft operatively connected with said gathering means, said driving shaft being operated direct from said traction member, and means for operating said driven shaft at variable speeds from said driving shaft.

22. In a harvesting machine, a traction member, a stalk gathering means, a stalk conveying mechanism, means for driving both of said means from said traction member, a motor, a harvester cutter, a chopping mechanism, means for delivering stalks to said chopping mechanism from the said conveying mechanism, means for elevating and delivering said chopped stalks, all the latter means being driven from said motor.

23. In a harvesting machine the combination of means for gathering, elevating and conveying stalks, a chopping mechanism designed to receive said stalks butt end first, comprising a feeding mechanism, a chopping device, said feeding mechanism including a rotary beater, said beater including a shaft, a frame for supporting said beater provided with guide members for receiving said shaft, the shaft of said beater having its ends capable of lateral and independent movement within said guide members, and means for driving said beater when in any position of said lateral movements.

24. In a mechanism for chopping stalks, a support, a chopping mechanism, means for feeding stalks to said chopping mechanism endwise, said means including a frame having a pair of guide members, a beater within said frame and having a shaft, the shaft of said beater having its ends capable of lateral and independent movement, means for driving said feeding mechanism and the said rotary beater when the shaft of said beater is in any one of its positions of lateral movement.

25. In a harvesting machine, a stalk gathering means, a harvester cutter designed to operate in a substantially horizontal plane, a chopping mechanism and means for moving the said stalks from said harvester cutter to said chopping mechanism, including a butt conveying trough provided with a flexible conveyor member having laterally extended stalk engaging devices, the lower end of said trough being located adjacent to said harvester cutter and so arranged that the stalk engaging devices of said conveyor will travel above said harvester cutter to pull the butt ends of the severed stalk from said cutter into the said trough, means at the delivery end of said flexible conveyor for delivering the stalks to the said chopping mechanism.

26. In a harvesting machine, a stalk gathering means, a harvester cutter, a chopping mechanism, a transverse conveyor, said conveyor including an apron designed to deliver stalks to said chopping mechanism from its upper run, a primary and secondary beater located above the delivery end of said apron and in front of said chopping mechanism, a frame for supporting said beaters, said frame being provided with guide members to receive the shaft of said secondary beater, said shaft being rotatively, laterally and slidably mounted in said guide members, the ends of said shaft being capable of a lateral and independent movement, toward and from the delivery end of said apron, means for moving the stalks from said harvester cutter transversely to said transverse conveyor, the last said means including a butt conveying trough, one end of which is adjacent to said harvester cutter and the opposite end adjacent and in front of the primary beater, the said butt conveying trough being provided with an endless conveyor having butt engaging devices, the receiving end of said conveyor being so arranged that when operated the butt engaging devices of the endless conveyor will pass above the said harvester cutter and draw the butts of the stalks from said cutter into said conveying trough, the delivery end of said conveyor being so arranged and located that as the butt ends of the stalks are delivered from the trough to the transverse conveyor the said butt ends will be engaged by the said primary beater and cause the stalk to be disengaged from the stalk engaging members of said conveyor and to be thrown laterally onto the said apron.

27. In a harvesting machine, a stalk gathering means, a harvester cutter, means for operating on the stalks, means for moving the stalks from said harvester cutter to said stalk operating means, the last named means including a butt conveying trough provided with flexible conveyor members having laterally extending stalk engaging devices, and means for feeding the stalks to said operating means.

28. In a harvesting machine, stalk gathering means, a harvester cutter, an inclined transverse conveyor, a chopping mechanism at the lower and delivery end of said transverse conveyor, means for delivering stalks from the said harvester cutter to said transverse conveyor, the upper end of said transverse conveyor being of such elevation and the conveyor of such inclination that the upper ends of long stalks received thereby will pass above the upper ends of upstanding stalks in the adjacent row of stalks that has not been cut.

29. In a harvesting machine, a stalk gathering means, a harvester cutter for severing the stalks while in an upright standing position, a chopping mechanism, an inclined transverse conveyor for feeding stalks, butt ends first, to said chopping mechanism, and means for receiving the stalks from said harvester cutter and delivering them to the said inclined transverse conveyor, the last said means including an inclined platform and a butt conveying trough, conveying chains mounted in said platform for moving the stalks laterally above said platform and delivering them to said transverse conveyor, the space above the delivery end of said platform being left open, an operator's seat adjacent to one side of said open portion of said stalk conveying mechanism so that the operator may assist any tangled stalks which may become clogged while being delivered from the said conveying mechanism to the said transverse conveyor.

30. In a harvesting machine, a stalk gathering means, a harvester cutter for severing the stalks while in an upright standing position, a chopping mechanism, means for feeding the severed stalks to said chopping mechanism, means for feeding the severed stalks to the last said means, said means including an inclined platform and a butt conveying trough, conveying chains mounted in said platform for moving the stalks laterally above said platform and delivering them to said means for feeding the chopping mechanism, the space above the delivery end of said platform being left open so that an operator may assist any tangled stalks which may become clogged while being delivered to the means for feeding the chopping mechanism.

31. In a harvesting machine, a stalk gathering means, a harvester cutter, means for operating on the stalks, means for moving the stalks from said harvester cutter to said stalk operating means, the last named means including a butt conveying trough, said stalk moving means including a flexible conveyor having laterally extending stalk engaging devices located a slight distance above said trough.

32. In a harvesting machine, a stalk gathering means, a harvester cutter, means for operating on the stalks, means for moving the stalks from said harvester cutter to said stalk operating means, the last named means including a butt conveying trough, said stalk moving means including a flexible conveyor having laterally extending stalk engaging devices located a slight distance above said trough, the stalk engaging devices being designed to travel close enough to the bottom of said trough to engage the butt ends of said stalks when lying parallel with the bottom of said trough.

33. In a harvesting machine, a stalk gathering means, a harvester cutter, means for operating on the gathered stalks, a conveying mechanism for receiving the stalks from said gathering means in a vertical position and for delivering them to the means for operating on the stalks in a transverse and inclined position, said mechanism including a platform having its forward edge adjacent to said gathering means and substantially vertically and its back edge inclined at substantially 45° to said front edge, the lower edge of said platform being provided with a trough having its forward end adjacent to the harvester cutter and its back and upper end adjacent to the means for operating on the stalks.

34. In a harvesting machine, a stalk gathering means, a harvester cutter designed to operate in a substantially horizontal plane, means for operating on the gathered stalks, means for moving said stalks and said harvester cutter to said means for operating on the stalks including a butt conveying trough provided with a flexible conveyor member having laterally extended stalk engaging devices, the lower end of said trough being located adjacent to said harvester cutter and so arranged that the stalk engaging devices of said conveyor will travel above said harvester cutter to pull the butt ends of the severed stalks from said cutter into said trough.

35. In a harvester, a stalk gathering means, a cutter for severing the stalks while in a standing position, means for operating on the severed stalks, means for feeding the severed stalks to said operating means, the last said means including an inclined platform and a butt conveyor, means for moving the stalks laterally over said platform and feeding them to said operating means, the space above said platform being left open so an operator may assist any tangled stalks which may become clogged while being delivered to the means for feeding said operating means.

36. In a harvester, a stalk gathering means, a cutter for severing the stalks while in a standing position, means for operating on the severed stalks, means for feeding the severed stalks to said operating means, the last said means including an inclined platform and a butt conveyor, means for moving the stalks laterally over said platform and feeding them to said operating means, the space above said platform being left open so an operator may assist any tangled stalks which may become clogged while being delivered to the means for feeding said operating means, and a seat located near one side of said inclined platform and opposite the said open space.

37. In a harvesting machine, a stalk gathering means, a harvester cutter, an inclined transverse conveyor, means for operating on the gathered stalks located near the lower and delivery end of said transverse conveyor, means for delivering stalks from said harvester cutter to said transverse conveyor, the upper end of said transverse conveyor being of such inclination that the upper ends of long stalks received thereby will pass above the upper ends of the upstanding stalks in the adjacent row of stalks that has not been cut.

Des Moines, Iowa, January 7, 1921.

WILLIAM B. THIEMANN.